3,663,443
BLEACHING COMPOSITION

Dominique Du Bois, Amiens, France, Jorgen Heino, London, England, and Alan Frank Walden, Cincinnati, Ohio, assignors to The Procter & Gamble Company, Cincinnati, Ohio
No Drawing. Filed Nov. 20, 1969, Ser. No. 878,577
Claims priority, application France, Nov. 27, 1968, 175,556
Int. Cl. C11d 7/18, 7/56
U.S. Cl. 252—99      10 Claims

ABSTRACT OF THE DISCLOSURE

A bleaching composition containing a builder, detergent, water-soluble hydrogen peroxide addition compound, and a copolymer of a vinyl compound of formula RCH=CHR where one R represents a hydrogen atom and the other R represents an alkyl ether radical having one to four carbon atoms or a hydrogen atom. The bleaching composition has an improved bleaching action due to the reduced rate of active oxygen loss from the hydrogen peroxide addition compound in the aqueous solution. The reduction in the rate of active oxygen loss is accomplished by the inclusion of a minor amount of the copolymer in the bleaching composition.

---

The present invention pertains to a bleaching composition which is generally in granular or powdered form with improved bleaching performance. Specifically, it pertains to a bleaching composition comprising a hydrogen peroxide addition compound, which decomposes upon contact with water yielding hydrogen peroxide; and, a water-soluble copolymer of maleic anhydride and a vinyl compound, or a water-soluble salt thereof. More specifically, this invention relates to a bleaching composition, having detergent properties comprising an organic surface-active agent, a water-soluble inorganic builder, used alone or in combination with a water-soluble organic builder, a hydrogen peroxide addition compound, and a water-soluble copolymer of maleic anhydride and a vinyl compound, or a water-soluble salt thereof.

It is known that the hydrogen peroxide addition compounds or "peroxyhydrates," for example, sodium perborate, decompose in aqueous solution, and rapidly release their active oxygen at high temperature, e.g. above about 80° C. Said rapid release of oxygen can damage textile materials, and especially fine garments, embroidery, and the like; it also prevents an adequate and effective use of the available active oxygen for bleaching purposes.

Many attempts have been made to control the rapid release of oxygen in aqueous solutions to avoid damage to textile materials, and to obtain an optimum bleaching effect. Other attempts have been directed to initiating the release of oxygen at temperatures below 80° C. by adding activators. Monoacyl derivatives of hydantoin have been proposed for this purpose in the British Pat. 965,672. German Pat. 271,155 teaches controlling the release of oxygen of peroxyhydrates at about 80 to 85° C. by incorporating tin derivatives, while in U.S. Pats. 2,121,952 and 2,141,189, alkali earth metal silicates are proposed for this purpose. And, in the German Pat. 721,317, the addition is suggested of aminocarboxylic acids (or salts thereof) substituted in the alpha-position by more than one carboxyl radical.

The tin derivatives precipitate in aqueous solution as insoluble stannic oxide; the alkali earth metal silicates are only slightly soluble in water; both may stain textile materials. The use of aminocarboxylic acids is inadequate because some of the peroxyhydrates decompose vigorously at or near boiling temperature when these acids are also present in the aqueous solution.

By the present invention, a bleaching composition is provided which permits an effective control of the decomposition rate of the hydrogen peroxide in the aqueous solution, and an adequate use of the active oxygen in the composition which, in turn, results in a better bleaching control and regulation than heretofore possible.

These and other advantages will become apparent from the following description of the invention.

Hydrogen peroxide addition compounds decompose in aqueous solution at high temperatures yielding $H_2O_2$ and salts. Said hydrogen peroxide in turn decomposes to release oxygen. The adequate use of the active oxygen according to the present invention is obtained by controlling the decomposition rate of the hydrogen peroxide. The decomposition rate of the $H_2O_2$ is also influenced by the pH of the solution, the alkali metal ions, which are present, the temperature of the solution, the water hardness and the container materials in which the bleaching is performed.

It has now been found that the decomposition rate of the $H_2O_2$ in an aqueous bleaching or bleaching and detergent solution, can be controlled if in the solution is present at small amount of a water-soluble copolymer of maleic anhydride and a vinyl compound of the formula RCH=HCR, wherein one R represents a hydrogen atom and the other R represents a $C_{1-4}$ alkyl ether radical or a hydrogen atom, or a water-soluble alkali metal or ammonium salt of said copolymer.

Thus, the present invention pertains to a bleaching, or bleaching and detergent composition comprising, by weight, from 0% to about 50% of a surface-active agent selected from the group consisting of anionic, amphoteric, zwitterionic and nonionic detergent, and mixtures thereof (or a "non-cationic" detergent); from about 10% to about 80% of a water-soluble, inorganic builder salt, or mixtures thereof; from about 0.1% to about 5% of active oxygen in the form of a water-soluble hydrogen peroxide addition compound or mixtures thereof; and from about 0.25% to about 10% of a water-soluble copolymer of a vinyl compound of the formula RCH=CHR wherein one R represents a hydrogen atom and the other R represents a $C_{1-4}$ alkyl ether radical or hydrogen atom, and maleic anhydride, or a water-soluble alkali metal or ammonium salt of said copolymer.

Detergent and bleaching compositions, which are preferred, contain, by weight, from about 5% to about 20% of a non-cationic detergent, from about 15% to about 60% of an inorganic builder salt (preferably, sodium tripolyphosphate), from about 0.5% to about 5% of active oxygen in the form of a water-soluble inorganic hydrogen peroxide addition compound, and from about 0.5% to about 5% of a water-soluble copolymer of a vinyl compound of the formula RCH=CHR, wherein one R represents a hydrogen atom and the other R represents an —OCH₃ radical or a hydrogen atom, and maleic anhydride, or water-soluble alkali metal or ammonium salt of said copolymer. Maleic anhydride-vinyl methyl ether is the most preferred copolymer.

The detergent composition can have any of the several commercially available forms, for example, granular, powder, flake and tablet forms. The granular and powdered forms are preferred.

The degree of polymerization of the copolymer influences its water solubility. It is difficult, however, to establish an absolute value on the upper and the lower limit of the degree of polymerization, which may vary within a wide range. It is essential that the copolymer is adequately water-soluble under ordinary bleaching and washing conditions. There is a recognized correlation between the viscosities of polymeric compounds and their relative molecular weights or degrees of polymerization. These viscosity figures are quite meaningful and they are frequently more readily available than the molecular weights. Therefore, the copolymers described hereinafter are characterized either in terms of their specific viscosity or in centipoises. For each copolymer the most suitable term is given. For the maleic anhydride-vinyl ether $C_{1-4}$ alkyl copolymers, the specific viscosity varies preferably between 0.1 and 6.0, most preferably between 0.2 and 5.0; the specific viscosity is defined by measuring the viscosity of 1 g. of the copolymer in 100 cc. methylethylketone in a Cannon-Fenske viscosity meter at 25° C. The viscosity of the maleic anhydride-ethylene copolymer varies preferably between 1.2 and 100 centipoises when measured as an aqueous solution containing 2% of the copolymer—the solution being adjusted to have a pH of about 10—in a Brookfield RTV viscosity meter at 10 r.p.m. and at 25° C.

The hydrogen peroxide addition compounds, which are used in the compositions of the invention are organic or, preferably, inorganic in nature. A great variety of these compounds exists. Most of them are prepared by crystallization from solutions containing $H_2O_2$. Others are prepared by drying a slurry containing the corresponding salts and $H_2O_2$. The most important hydrogen peroxide addition compounds are the perborates, e.g. the sodium perborate mono- and tetrahydrates. Other perborates which can be used in the present invention are the potassium and ammonium or "true" perborates having the formulae $2KBO_3H_2O$ and $2NH_4BO_3 \cdot H_2O$, respectively. Other valuable hydrogen peroxide addition compounds are the carbonate peroxyhydrates, e.g., $2Na_2CO_3 \cdot 3H_2O_2$, and the phosphate peroxyhydrates. Although a great variety of sodium potassium, ammonium and alkali earth metal phosphates can be used, sodium pyrophosphate peroxyhydrate $(Na_4P_2O_7 \cdot 2H_2O_2)$ is preferred. The most suitable organic hydrogen peroxide addition compound which can be used in the present invention is the urea peroxide $(CO(NH_2)_2 \cdot H_2O_2)$, because it is one of the few free flowing dry organic hydrogen peroxide addition compounds.

The following tests illustrate the effectiveness of the water-soluble maleic anhydride-vinyl methyl ether copolymers and maleic anhydride-ethylene copolymers in controlling the decomposition rate of hydrogen peroxide, which is obtained by the decomposition of the hydrogen peroxide addition compounds in aqueous solutions.

Test A

To five aqueous solutions (water hardness 3.4 millimoles/1 $Ca^{++}$ and $Mg^{++}$, ratio $Ca^{++}$; $Mg^{++}$ about 3:1) was added sodium perborate tetrahydrate, corresponding to 200 p.p.m. active oxygen, and 0.5% by weight of a detergent composition consisting of 10% of sodium alkylbenzene sulfonate (average C atoms of alkyl radical: 11.8), 2% of a polyoxyethylene-polyoxypropylene condensate (molecular weight of polyoxypropylene: 1750, polyoxyethylene: 80% by weight of total weight of condensate), 32% of sodium tripolyphosphate, 6% of sodium silicate, 2% of hydrogenated fish oil fatty acid (average molecular weight 285), 6% of sodium sulfate, and 42% of moisture (all percentages by weight).

The first solution was used as a reference. To the second and third aqueous solution 1.0% and 5% respectively by weight, calculated on the weight of the detergent composition, of the water-soluble maleic anhydride-vinyl methyl ether copolymer were added. And to the fourth and fifth aqueous solution 1.0% and 5% respectively by weight, based on the weight of the detergent composition, of the water-soluble maleic anhydride-ethylene copolymer were added.

Each aqueous solution was heated to and maintained at 92° C. The active oxygen was determined after 5, 10, 15 and 20 minutes by the permanganate method. (See, for details, "Quantitative Inorganic Analysis," by A. Vogel, third edition, 1962, Longmans, London, page 295; but whereby 50 cc. of a sample solution was acidified with 50 cc. of sulfuric acid (0.1 N), and titrated with a 0.1 N solution of $KMnO_4$, until permanent pink; 1 cc. $KMnO_4 = 16$ p.p.m. of active oxygen). The results are presented in Table I.

TABLE I

| Solution | $H_2O_2$ decomposition controlling agent | Percent by weight [1] | Percent of active oxygen available after— | | | |
|---|---|---|---|---|---|---|
| | | | 5 min. | 10 min. | 15 min. | 20 min. |
| 1 | | 0 | 78 | 65 | 56 | 52.5 |
| 2 | Maleic anhydride-vinyl methyl ether copolymer.[2] | 1.0 | 82 | 71 | 63 | 58 |
| 3 | do.[2] | 5.0 | 90 | 85 | 80.5 | 77 |
| 4 | Maleic anhydride-ethylene copolymer.[3] | 1.0 | 88 | 69 | 59 | 56 |
| 5 | do.[3] | 5.0 | 92 | 89 | 85 | 82.5 |

[1] Percentage by weight of copolymer calculated on weight of detergent composition.
[2] Specific viscosity about 0.4 (1 g. in 100 cc. methylethylketone at 25° C.); ratio of monomers 1:1.
[3] Viscosity, 2 cps. in 2% aqueous solution at 25° C.; ratio of monomers 1:1.

Test B

The effectiveness of those copolymers when compared with a strong sequestering agent, such as, for example, ethylenediaminetetraacetic acid (EDTA) is shown in Table II. To emphasize the effect, seven solutions were prepared with deionized water, containing 1 p.p.m. of $Fe^{+++}$ ions, and 0.5% by weight of the detergent composition described in Test A. Each solution was heated to and maintained at 92° C. To each solution was then added sodium perborate tetrahydrate, corresponding to 200 p.p.m. of active oxygen, and at the same time 1.0% and 5% respectively by weight, based on the weight of the detergent composition, of ethylenediaminetetraacetic acid to solutions 2 and 3, of maleic anhydride-vinyl methyl ether copolymer to solutions 4 and 5, and of maleic anhydride-ethylene copolymer to solutions 6 and 7. The active oxygen available at 5, 10, 15, and 20 min. was determined by the permanganate method for solutions 1, 4, 5, 6 and 7, and by the thiosulfate method for the solutions containing EDTA. (Thiosulfate method: a 10 cc. sample solution is acidified with sulfuric acid 1.0 N; 30 cc. of a 15% IK solution+100 cc. distilled water is added, and the whole is stirred; after 10 minutes in the dark it is titrated with 0.01 thiosulfate; when yellow color fades, 0.5 g. starch is added and titration continued until colorless solution is obtained.)

TABLE II

| Solution | $H_2O_2$ decomposition controlling agent | Percent by weight [1] | Percent of active oxygen available after— | | | |
|---|---|---|---|---|---|---|
| | | | 5 min. | 10 min. | 15 min. | 20 min. |
| 1 | | 0 | 75 | 56 | 46.5 | 50 |
| 2 | EDTA | 1 | 66 | 54.5 | 45.5 | 33 |
| 3 | EDTA | 5 | 73.5 | 61.5 | 51 | 35.5 |
| 4 | Maleic anhydride-vinyl methyl ether copolymer.[2] | 1 | 80 | 56 | 46 | 39 |
| 5 | do.[2] | 5 | 83 | 76.5 | 72 | 66.5 |
| 6 | Maleic anhydride-ethylene copolymer.[3] | 1 | 79 | 65.5 | 56 | 48 |
| 7 | do.[3] | 5 | 86 | 86 | 83.5 | 80.5 |

[1] Percentage by weight of decomposition controlling agent, calculated on the weight of detergent composition.
[2] Specific viscosity, about 0.4; ratio of monomers 1:1.
[3] Viscosity, 2 cps. in 2% aqueous solution at 25° C.; ratio of monomers 1:1.

Comparing the percentages of available active oxygen in Table II, EDTA at 1% concentration seems to enhance the decomposition of the hydrogen peroxide addition compound, while the difference in available active oxygen between solutions with and without 5% EDTA after 20 min. is insignificant. The difference in available active oxygen in the solution containing 5% of maleic anhydride-ethylene copolymer and the control solution after 20 minutes is more than 40%.

Test C

To compare the effectiveness as $H_2O_2$ decomposition controlling agent in aqueous solutions of maleic anhydride-ethylene copolymer over maleic anhydride polymer, five tests as described in the section "Test B" were run. But instead of $Fe^{+++}$ ions, the test solutions contained 1 p.p.m. of $Cu^{++}$ ions. The active oxygen available at 5, 10, 15 and 20 min. was determined by the permanganate method. The results are presented in Table III.

TABLE III

| Solution | $H_2O_2$ decomposition controlling agent | Percent by weight[1] | Percent of active oxygen available after— | | | |
|---|---|---|---|---|---|---|
| | | | 5 min. | 10 min. | 15 min. | 20 min |
| 1 | | 0 | 37 | 23 | 17.5 | 13 |
| 2 | Maleic anhydride-ethylene copolymer.[2] | 1 | 56.5 | 38 | 28 | 22.5 |
| 3 | do.[3] | 5 | 74.5 | 60.5 | 55 | 46.5 |
| 4 | Maleic anhydride-polymer.[3] | 1 | 43.5 | 28 | 21 | 15.5 |
| 5 | do.[3] | 5 | 55 | 35.5 | 27.5 | 21.5 |

[1] Percentage by weight of decomposition controlling agent calculated on the weight of detergent composition.
[2] Specific viscosity about 0.4; ratio of monomers 1:1.
[3] Viscosity, 2 cps. in 2% aqueous solution at 25° C.

According to Table III, solution 1, copper ions $Cu^{++}$ enhance the hydrogen peroxide decomposition. The decomposition controlling effect of the maleic anhydride polymer is rather small when compared with the effect obtained by the maleic anhydride-ethylene copolymer, since the percentages of available active oxygen of solution 5 are lower than those of solution 2, either after 5, 10, 15 or 20 minutes, notwithstanding the higher amount of polymer present.

Test D

The surprising effect of the copolymers of maleic anhydride and a vinyl compound as defined hereinbefore, in detergent solutions containing hydrogen peroxide addition compounds is also apparent from the following tables.

Sodium perborate tetrahydrate stability is extremely sensitive to pH increase, and especially in the range 8.5–9.0 and above. It is also known that the decomposition rate of $H_2O_2$ increases with increasing pH, and is catalyzed by copper and iron ions. To simulate said worse conditions, aqueous solutions were prepared of deionized water, into which $Cu^{++}$ ions and $Fe^{+++}$ ions were added. The concentration of the bleaching and detergent composition, specified hereinafter, in each solution was 0.6% by weight. The pH of said aqueous solutions was above 8.5.

The following compositions (Table IV) were tested (figures are percent by weight) in aqueous solutions containing 0.5 p.p.m. of $Cu^{++}$ ions and 0.5 p.p.m. of $Fe^{+++}$ ions.

TABLE IV

| Composition | I | II | III | IV | V | VI |
|---|---|---|---|---|---|---|
| Surfactant [1] | 10 | 10 | 10 | 10 | 15 | 15 |
| Builder [2] | 45 | 45 | 45 | 45 | 40 | 40 |
| Peroxyhydrate [3] | 35 | 35 | 35 | 35 | 25 | 25 |
| Copolymer [4] | 0 | 5 | 0 | 5 | 0 | 5 |
| Balance [5] | 10 | 5 | 10 | 5 | 20 | 15 |

[1] Surfactant, consisting of:
  (a) 65.5% by weight of a sodium straight-chain alkyl benzene sulfonate (average 0 atoms in alkyl radical 11.8)
  (b) 21% by weight of hydrogenated fish oil (average molecular weight 285)
  (c) 13.5% by weight of a tallow alcohol-ethylene oxide condensate, (average oxide units 11)
except for compositions V and VI, wherein the surfactant is the Na 3-(N,N-dimethyl-N-coconut alkylammonio)-2-hydroxypropane-1-sulfonate.
[2] Builder:
  (a) Examples I and II, sodium pyrophosphate
  (b) Examples III and IV, a 3:1 mixture of sodium tripolyphosphate and sodium ethylenediaminotetraacetate
  (c) Examples V and VI, sodium tripolyphosphate
[3] Peroxyhydrate, sodium perborate tetrahydrate.
[4] Copolymer, a 1:1 maleic anhydride-vinyl methyl ether, having a specific viscosity of 0.4 (1 gram in 100 cc. methylethylketone solution at 25° C.).
[5] Balance, sodium sulfate.

The percentages of active oxygen available after 10 and 20 minutes in the aqueous solutions maintained at 92° C., measured according to the usual permanganate method, are:

TABLE V

| Time | Composition— | | | | | |
|---|---|---|---|---|---|---|
| | I | II | III | IV | V | VI |
| 10 minutes | 50 | 79 | 66 | 77 | 12 | 80 |
| 20 minutes | 34 | 73 | 49 | 67 | 10 | 75 |

The effectiveness of the maleic anhydride-vinyl methyl ether copolymer in the solutions II, IV and VI is evident from said Table V.

Test E

The scope of the invention, and the surprising results can also be seen from the following series of tests (Tables VI and VII), whereby the active oxygen available was measured after 20 minutes according to the usual permanganate method. The concentration of the detergent composition specified below is 0.6% by weight, the temperature of the solutions 92° C., and the water is deionized water into which $Cu^{++}$ and/or $Fe^{+++}$ ions were added.

TABLE VI

| Composition | VII | VIII | IX | X | XI | XII | XIII | XIV | XV | XVI |
|---|---|---|---|---|---|---|---|---|---|---|
| Surfactant [1] | 10 | 10 | 10 | 25 | 25 | 25 | 10 | 10 | 35 | 35 |
| Builder [2] | 60 | 60 | 60 | 35 | 35 | 35 | 45 | 45 | 45 | 45 |
| Peroxyhydrate [3] | 20 | 20 | 20 | 30 | 30 | 30 | 35 | 35 | 10 | 10 |
| Copolymer [4] | 0 | 3 | 7 | 0 | 3 | 7 | 0 | 5 | 0 | 2 |
| Balance [5] | 10 | 7 | 3 | 10 | 7 | 3 | 10 | 5 | 10 | 8 |

[1] Surfactant, as Examples I–IV of Table IV.
[2] Builder, sodium tripolyphosphate.
[3] Peroxyhydrate, sodium perborate tetrahydrate.
[4] Copolymer, a 1:1 maleic anhydride-vinyl methyl ether copolymer having a specific viscosity of 0.4.
[5] Balance, sodium sulfate.

The percent of active oxygen available after 20 min. at 92° C. is:

TABLE VII

| Contaminant | Composition— | | | | | | | | | |
|---|---|---|---|---|---|---|---|---|---|---|
| | VII | VIII | IX | X | XI | XII | XIII | XIV | XV | XVI |
| 1 p.p.m. of $Cu^{++}$ | 7 | 25 | 60 | 3 | 13 | 39 | 5 | 13 | 10 | 31 |
| 1 p.p.m. of $Fe^{+++}$ | 41 | 88 | 89 | 24 | 60 | 85 | 24 | 78 | 69 | 100 |
| 0.5 p.p.m. of $Cu^{++}$ and 0.5 p.p.m. of $Fe^{+++}$ | | | | | | | | 8 | 35 | 13 | 33 |

The surprising effectiveness in controlling the $H_2O_2$ decomposition rate by the copolymer is evident when comparing the results of composition VII with VIII and IX, or composition X with XI and XII, or XIII with XIV, and XV with XVI.

The surface active agents which can be used in the compositions of the present invention includes: anionic, amphoteric, zwitterionic, and nonionic detergent and mixtures thereof. These suitable substances are enumerated below.

(a) Anionic detergent which can be used in the compositions of this invention include both soap and non-soap detergent compounds. Examples of suitable soaps are the sodium, potassium, ammonium and alkylammonium salts of higher fatty acids ($C_{10}$–$C_{20}$). Examples of anionic organic non-soap detergent compounds are the water-soluble alkali metal salts or organic sulfuric reaction products having in their molecular structure an alkyl radical containing from about 8 to about 22 carbon atoms and a radical selected from the groups consisting of sulfonic acid and sulfuric acid ester radicals. (Included in the term alkyl is the alkyl portion of higher acyl radicals.) Important examples of the synthetic detergents which form a part of the compositions of the present invention are the sodium or potassium alkyl sulfates, especially those obtained by sulfating higher alcohols ($C_8$–$C_{18}$ carbon atoms); sodium or potassium alkyl benzene sulfonates, such as are described in U.S. Pats. 2,220,009 and 2,477,383, in which the alkyl group contains from about 9 to about 15 carbon atoms; sodium alkyl glyceryl ether sulfonates especially those ethers of the higher alcohols derived from tallow and coconut oil; sodium coconut oil fatty acid monoglyceride sulfates and sulfonates; sodium or potassium salts of sulfuric acid esters of the reaction product of one mole of a higher fatty alcohol (e.g. tallow or coconut oil alcohols) and about 1 to 6 moles of ethylene oxide; sodium or potassium salts of alkyl phenol ethylene oxide ether sulfate with about 1 to about 10 units of ethylene oxide per molecule and in which the alkyl radicals contain about 9 to about 12 carbon atoms; the reaction product of $C_{10-22}$ fatty acids with taurines or isethionic acid and neutralized with sodium hydroxide; and others known in the art, a number being specifically set forth in U.S. Pats. 2,486,921; 2,486,922 and 2,396,278.

(b) Nonionic synthetic detergents may be broadly defined as compounds aliphatic or alkylaromatic in nature which do not ionize in water solutions. For example, compounds formed by condensing ethylene oxide with a hydrophobic base formed by the condensation of propylene oxide with propylene glycol, whereby the hydrophobic portion of the molecule has a molecular weight of from about 1,500 to 1,800, and the polyoxyethylene content is about 50% of the total weight of the condensation product Other suitable nonionic synthetic detergents include:

(1) The polyethylene oxide condensates of alkyl phenols, e.g., the condensation products of alkyl phenols having an alkyl group containing from about 6 to 12 carbon atoms, with ethylene oxide, the said ethylene oxide being present in amounts equal to 10 to 25 moles of ethylene oxide per mole of alkyl phenol.

(2) Those derived from the condensation of ethylene oxide with the product resulting from the reaction of propylene oxide and ethylenediamine. For example, compounds containing from about 40% to about 80% polyoxyethylene by weight and having a total molecular weight of from about 5,000 to about 11,000 resulting from the reaction of ethylene oxide groups with a hydrophobic base constituted of the reaction product of ethylene diamine and excess propylene oxide, said hydrophobic base having a molecular weight of the order of 2,500 to 3,000 are satisfactory.

(3) The condensation product of $C_{10-22}$ aliphatic alcohols having from 8 to 18 carbon atoms, with from 10 to 30 moles of ethylene oxide per mole of alcohol.

(4) Long chain tertiary amine and phosphine oxides corresponding to the following general Formula $$R_1R_2R_3X \rightarrow O$$

wherein X represents a nitrogen or phosphorus atom, $R_1$ is an alkyl radical of from about 8 to 18 carbon atoms, and $R_2$ and $R_3$ are each methyl or ethyl radicals. The arrow in the formula is a conventional representation of a semi-polar bond. Examples of such oxides suitable for use in this invention include dimethyldodecylamine oxide, and dimethyloctylamine oxide, dimethyldodecylphosphine oxide, and ethylmethyltetradecylphosphine oxide.

(5) Dialkyl sulfoxides corresponding to the following formula $RR'S \rightarrow O$, wherein R is an alkyl, alkenyl, beta- or gamma-monohydroxyalkyl radical or an alkyl or beta- or gamma-monohydroxyalkyl radical containing one or two other oxygen atoms in the chain, the R groups ranging from 10 to 18 carbon atoms in chain length, and wherein R' is methyl or ethyl. Examples of suitable sulfoxide compounds are: dodecyl methyl sulfoxide and 3-hydroxytridecyl methyl sulfoxide.

(c) Ampholytic synthetic detergents can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group. Examples of compounds falling within this definition are sodium-3-dodecylaminopropionate and sodium-3-dodecylaminopropanesulfonate.

(d) Zwitterionic synthetic detergents can be broadly described as derivatives of aliphatic quaternary ammonium compounds in which the aliphatic radical may be straight chain or branched and wherein one of the aliphatic substituents contains from about 8 to 18 carbon atoms and one contains an anionic water solubilizing group. Examples of compounds falling within this definition are 3-(N,N-dimethyl-N-hexadecylammonio)propane-1-sulfonate and 3-(N,N-dimethyl-N-hexadecylammonio)-2-hydroxypropane-1-sulfonate which are especially preferred for their excellent detergency characteristics.

The anionic, nonionic, ampholytic and zwitterionic detergents mentioned above can be used singly or in combination in the practice of the present invention. The above examples are merely specific illustrations of the numerous detergents which can find application within the scope of this invention.

The builders which can be used in the compositions of the present invention include the water-soluble inorganic alkaline builder salts, used as such or in combination with organic alkaline builder salts. Suitable inorganic builder salts are the soluble polyphosphate salts such as sodium or potassium pyrophosphate and tripolyphosphate, further sodium silicate, sodium carbonate and sodium borate. Suitable organic builder salts are the sodium and potassium ethylenediaminetetraacetates and nitriloacetates, the sodium and potassium lower alkyl diphosphonates such as trisodium ethylene-1-hydroxy-1,1-diphosphonate, the alkali metal salts of phytic acids such as sodium phytate, and mixtures of said inorganic and organic builder salts.

The detergent compositions contain preferably a builder and a detergent in the weight ratio of about 1:3 to about 10:1. The preferred ratio of builder to detergent is about 1:2 to about 5:1.

In a finished detergent formulation of this invention there will often be added minor amounts of materials which make the product more attractive. The following are mentioned by way of example. Sodium carboxymethyl cellulose (hereinafter designated as CMC) can be added in minor amounts to inhibit soil redeposition. A tarnish inhibitor such as benzotriazole or ethylenethiourea can also be added in amounts up to about 2%. Fluorescers, perfume and color, while not essential in the compositions of the invention, can be added in small amounts. An alkaline material or alkali such as sodium hydroxide or potassium hydroxide can be added in minor amounts as supplementary pH adjusters. There might also be mentioned as suitable additives: bacteriostats, sodium sulfate, and sodium carbonate and bactericides.

Corrosion inhibitors generally are also added. Soluble silicates are highly effective inhibitors and can be added to certain formulas of this invention at levels of from about 3% to about 8%. Alkali metal, preferably potassium or sodium, silicates having a weight ratio of $SiO_2:M_2O$ of from 1:1 to 2.8:1 can be used. M in this ratio refers to sodium or potassium. A sodium silicate having a ratio of $SiO_2:Na_2O$ of about 1.6:1 to 2.45:1 is especially preferred for economy and effectiveness.

In view of the increasing acceptance by the general public of built detergent compositions with oxygen bleaching agents for virtually all washing and cleaning situations especially laundering, it is a very significant contribution of this invention that an improved detergent product is made possible that will provide bleaching levels superior to a normally built product, because of the adequate use of the active oxygen in the bleaching and washing liquor, while the copolymers influence the whiteness maintenance properties of the washing solutions positively.

The following examples serve to illustrate, but not to limit the novel compositions of the present invention. All percentages in the examples are by weight.

EXAMPLE I

A granular bleaching and detergent composition described below, is prepared by slurrying the surface-active agents and builders, spray-drying the slurry, and mixing the perborate, copolymer and perfume with the spray-dried product. The end product consists of:

12% sodium alkylbenzene sulfonate (average chain length 11.8)
5% hydrogenated fish oil fatty acids (average mol. wt. 285)
3% tallow alcohol-ethylene oxide (average ethylene units 11)
35% sodium tripolyphosphate
5% sodium silicate
3% maleic anhydride-vinyl methyl ether copolymer (specific viscosity, about 0.4)
30% sodium perborate tetrahydrate
balance: sodium sulfate, CMC, perfume, moisture The maleic anhyride-vinyl methyl ether copolymer (ratio of monomers 1:1) can be replaced by the maleic anhydride-ethylene copolymer at an equal percentage basis, or by the disodium salts of one or both of them.

The sodium perborate tetrahydrate can be replaced on an equal percentage basis by the carbonate peroxyhydrate, $2Na_2CO_3 \cdot 3H_2O_2$, or by the sodium pyrophosphate peroxyhydrate $Na_4P_2O_7 \cdot 2H_2O_2$.

EXAMPLE II

A detergent composition was prepared by slurrying the detergent and builders, spray-drying the slurry, and adding the copolymer, perfume and perborate to the spray-dried product. The finished product consisted of:

6% sodium 3 - (N,N-dimethyl-N-tetradecylammonio)-2-hydroxypropane-1-sulfonate,
40% sodium tripolyphosphate,
25% sodium perborate tetrahydrate,
15% sodium sulfate, moisture, perfume,
5% maleic anhydride-vinyl methyl ether copolymer (specific viscosity, 0.4),
9% sodium silicate.

The percentage of active oxygen available in a washing solution, containing 0.5% by weight of said detergent composition, heated at 92° C., was, according to the usual permanganate method, after 10 minutes, 77%, and after 20 minutes, 65%.

Heavily soiled clothes, washed for 30 minutes with a solution of said detergent composition, were thoroughly cleaned and bleached.

Other suitable compositions are:

EXAMPLE III

6% of $C_{11-13}$ alkylbenzene sulfonate (Na salt),
3% of tallow alkyl sulfate (Na salt),
4% of polyoxyethylene polyoxypropylene condensate (molecular weight of polyoxypropylene 1750; polyoxyethylene 60% by weight),
2% of hydrogenated fish oil fatty acid (ave. mol. wt. 285),
40% of sodium pyrophosphate,
30% of sodium perborate tetrahydrate,
5% of maleic anhydride-ethylene copolymer,
10% of sodium sulfate, moisture, CMC brightener.

EXAMPLE IV

5% of tallow alcohol-ethylene oxide condensate (average oxide units 11),
2% of hydrogenated fish oil fatty acid (ave. mol. wt. 285),
40% of sodium tripolyphosphate,
30% of sodium perborate tetrahydrate,
2% of maleic anhydride-vinyl methyl ether,
16% of sodium sulfate,
5% of perfume, sodium silicate, moisture.

EXAMPLE V

8% of sodium $C_{11.8}$ alkylbenzene sulfonate,
4% of polyoxyethylene polyoxypropylene condensate (molecular weight of polyoxypropylene 1750; polyoxyethylene 80% by weight),
27% of sodium tripolyphosphate,
8% of sodium pyrophosphate,
20% of sodium pyrophosphate peroxyhydrate,
2% of maleic anhydride-vinyl methyl ether copolymer,
6% of sodium silicate,
25% of sodium sulfate, and minor amounts of CMC, perfume.

EXAMPLE VI

5% of Na salt of $C_{12-18}$ fatty acids,
10% of nonylphenol-ethylene oxide condensate (average oxide units, 8),
40% of sodium tripolyphosphate,
25% of sodium perborate tetrahydrate,
5% of maleic anhydride-vinyl methyl ether,
balance (sodium sulfate, moisture, sodium silicate, CMC).

The foregoing description and examples describe and illustrate certain operable and preferred embodiments of the present invention. It is not intended that the invention should be so limited since variations and modifications thereof will be obvious to those skilled in the art, all of which are within the spirit and scope of this invention.

What is claimed is:

1. A bleaching composition containing a minor portion of a copolymer of a vinyl compound and maleic anhydride or the corresponding alkali metal or ammonium salt of said copolymer, consisting essentially of:
   (a) from 0% to about 50% by weight of a surface-active agent selected from the group consisting of water-soluble anionic, amphoteric, zwitterionic and nonionic detergents, and mixtures thereof;
   (b) from about 10% to about 80% by weight of a water-soluble inorganic builder salt, or mixtures thereof, alone or in combination with a water-soluble organic builder salt, or mixtures thereof;
   (c) from about 0.1% to about 5% by weight of active oxygen, in the form of a water-soluble hydrogen peroxide addition compound selected from perborates, carbonate peroxyhydrates, phosphate peroxyhydrates, and urea peroxide; and (d) as said minor portion from about 0.25% to about 10% by weight of a water-soluble copolymer of:
  (1) a vinyl compound having the general formula RCH=CHR, wherein one R represents a hydrogen atom, and the other R represents a $C_{1-4}$ alkyl ether radical or a hydrogen atom, and
  (2) maleic anhydride, or the corresponding alkali metal or ammonium salt of said copolymer, wherein said copolymer has a monomer ratio of vinyl compound and maleic anhydride of about 1:1 and has a specific viscosity between 0.1 and 6.0 when one R represents a $C_{1-4}$ alkyl ether and a viscosity between 1.2 centipoises and 100 centipoises when each R represents a hydrogen atom.

2. The composition according to claim 1, consisting essentially of:
  (a) from about 5% to about 20% by weight of a surface-active agent selected from the group consisting of water-soluble anionic, amphoteric, zwitterionic and nonionic detergents, and mixtures thereof;
  (b) from about 15% to about 60% of an inorganic builder salt;
  (c) from about 0.5% to about 5% by wt. of active oxygen, in the form of a water-soluble inorganic hydrogen peroxide addition compound, and
  (d) from about 0.5% to about 5% by wt. of a water-soluble copolymer of:
    (1) a vinyl compound of the general formula RCH=CHR, wherein one R represents a hydrogen atom and the other R represents a —$OCH_3$ radical or a hydrogen atom, and
    (2) maleic anhydride, or the corresponding alkali-metal or ammonium salt thereof.

3. The composition according to claim 2 in which the surface-active agent is an anionic detergent.

4. The composition according to claim 3 in which the surface-active agent is a reaction product of sulfuric acid and $C_{10-18}$ fatty alcohols or $C_{9-15}$ alkylbenzenes, and the alkali metal salt thereof.

5. The composition according to claim 2 in which the surface-active agent is a nonionic detergent.

6. The composition according to claim 2 in which the surface-active agent is a zwitterionic detergent.

7. The composition according to claim 2 in which the active oxygen is present as sodium perborate tetrahydrate.

8. The composition according to claim 2 in which the active oxygen is present as sodium pyrophosphate peroxyhydrate.

9. The composition according to claim 2 in which the builder salt is sodium tripolyphosphate.

10. The composition according to claim 2 in which said copolymer is a maleic anhydride-vinyl methyl ether copolymer.

References Cited
UNITED STATES PATENTS

| | | | |
|---|---|---|---|
| 3,308,067 | 3/1967 | Diehl | 252—161 |
| 3,454,500 | 7/1969 | Lancashire | 252—99 |
| 3,507,937 | 4/1970 | Zimmerer | 252—99 X |

MAYER WEINBLATT, Primary Examiner

U.S. Cl. X.R.

252—186